United States Patent
Bessler (12)

(10) Patent No.: US 6,318,160 B1
(45) Date of Patent: Nov. 20, 2001

(54) TESTING A POWER PLANT SYSTEM OF A LOCOMOTIVE UNDER A THERMALLY STEADY STATE

(75) Inventor: Warren Frank Bessler, Amsterdam, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/188,126

(22) Filed: Nov. 9, 1998

(51) Int. Cl.[7] ................................................. G01M 15/00
(52) U.S. Cl. ................................................................ 73/116
(58) Field of Search ........................... 73/116, 117.2, 73/117.3, 118.1; 123/41.01, 41.08, 41.29, 295, 358, 418

(56) References Cited

U.S. PATENT DOCUMENTS

| | | | |
|---|---|---|---|
| 4,223,654 | * 9/1980 | Wessel et al. | 123/358 |
| 4,425,878 | * 1/1984 | Samuel | 123/41.08 |
| 4,549,504 | * 10/1985 | Gaines et al. | 123/41.01 |
| 5,564,390 | * 10/1996 | Houtz et al. | 123/418 |
| 5,806,011 | 9/1998 | Azzaro et al. | 701/99 |
| 6,006,731 | * 12/1999 | Uzkan | 123/41.29 |
| 6,058,904 | * 5/2000 | Kruse | 123/295 |

\* cited by examiner

Primary Examiner—George Dombroske
(74) Attorney, Agent, or Firm—Patrick K. Patnode; Douglas E. Stoner

(57) ABSTRACT

A diagnostic technique for testing a power plant system of a locomotive, desirably during routine scheduled maintenance, involves operating the power plant system in a thermally steady state. This is accomplished by operating an engine of the locomotive at a predetermined throttle position, operating radiator fans of a radiator operably connected to the engine at a predetermined speed, operating an alternator operably connected to the engine to apply a substantially constant load to the engine, and obtaining at least one measurement of the power plant system. The technique is readily implemented by a computing environment such as the locomotive's elaborate computer system.

18 Claims, 4 Drawing Sheets

TESTING A POWER PLANT SYSTEM OF A LOCOMOTIVE UNDER A THERMALLY STEADY STATE

BACKGROUND OF THE INVENTION

This invention relates generally to locomotives, and more specifically, to an apparatus and method for testing locomotive engines and associated systems.

During routine shop maintenance, generally every ninety-two days, the diesel engine of a locomotive is tested. For example, the diesel engine is typically operated at various predetermined horsepower levels while onboard temperature sensors and engine control parameters are recorded. The recorded data is then archived for future reference.

FIG. 1 diagrammatically illustrates a power plant system 10 of a locomotive. A diesel engine 30 is tested by operating throttle 20, which throttle 20 is operably connected to diesel engine 30, at each throttle position or notch. Each throttle position sets and fixes a different engine speed (i.e., rpm). A dynamic braking grid 50 (resistive heating elements used for braking the locomotive) imposes a load on an alternator 40, which alternator 40 is operably connected to diesel engine 30, to achieve a maximum horsepower for the set throttle position. During the test, electrical power normally provided to electric traction motors 60 for driving the wheels of the locomotive is diverted to dynamic braking grid 50. Each throttle position is maintained for a period of 15 to 20 minutes.

Attempts to analyze the recorded data are often unsuccessful because the water cooling radiator fans 80 of radiators 70 cycle between discrete speeds (off, ¼ speed, ½ speed, full speed) while maintaining the cooling water at an operating temperature of, for example, 155 degrees F. In addition, changing of the radiator fan speed is accomplished by having radiator fans 80 brought up to full speed and then adjusted downwardly to the desired lower speed. Fluctuation in the water cooling temperature due to the cycling of radiator fans 80 ranges from 5 degrees F. to 10 degrees F. depending on the throttle position and the ambient air temperature. The transient nature of the cooling system precludes accurate diagnostics of diesel engine 30 and associated systems, for example, thermal diagnostics that are on the same order of magnitude as the fluctuation in temperature of the water for determining whether the cooling system is operating a few degrees too hot or too cold. For diesel engine 30 operating at, for example, 900 rpms and 3,300 hp, FIG. 2 illustrates a graph of the cyclic nature of the cooling water temperature over time.

The cycling of radiator fans 80 on and off also varies the load on diesel engine 30 so that the horsepower generated by the engine (as determined by measuring the current and voltage produced by the alternator) varies over time as illustrated in FIG. 2. In particular, radiator fans 80 have a diameter of three to four feet and draw 100 hp during operation.

While such a test may indicate whether engine 30 is operating generally at an expected horsepower level at a specific throttle position, such a test cannot be used to readily identify trends in the performance of the engine, the thermal systems, the electrical power systems, etc. For example, on a hot day, although the horsepower level of the engine may be reached, the radiator fans may be operating at ¾ speed when they should be operating on ½ speed, or the fuel system may be providing excess fuel to the engine in order to reach the desired horsepower level.

Therefore, there is a need for an apparatus and method for testing a power plant system of a locomotive in which engine and associated systems are maintained in a thermally steady state.

SUMMARY OF THE INVENTION

The above-mentioned need is met by the present invention which relates to diagnostic techniques for testing a power plant system of a locomotive. One aspect of the present invention comprises a method for testing a power plant system of a locomotive in which the method includes the steps of maintaining the power plant system at a thermally steady state, and obtaining at least one measurement of the power plant system.

The step of maintaining the engine at a substantially constant operating temperature may include the step of operating a throttle operably connected to an engine at a predetermined throttle position, operating a radiator fan of a radiator operably connected to the engine at a predetermined radiator fan speed, and operating an alternator operably connected to the engine to apply a substantially constant load to the engine. Desirably, the predetermined radiator fan speed of the radiator fan is based on ambient temperature.

In another aspect of the present invention, an apparatus for testing a power plant system of a locomotive includes a controller adapted to maintain the power plant system at a thermally steady state, and the controller being adapted to obtain at least one measurement of the power plant system.

In still another aspect of the present invention, an article of manufacture comprises at least one computer usable medium having computer readable program code means embodied therein for causing the testing of a power plant system of a locomotive. The computer readable program code means in the article of manufacture includes computer readable program code means for maintaining the power plant system at a thermally steady state, and computer readable program means for obtaining at least one measurement of the power plant system.

In yet another aspect of the invention, at least one program storage device readable by a machine, tangibly embodying at least one program of instructions executable by the machine performs a method of testing a power plant system of a locomotive. The method includes maintaining the power plant system at a thermally steady state, and obtaining at least one measurement of the power plant system.

DETAILED DESCRIPTION OF THE INVENTION

The present invention provides a diagnostic technique for a power plant system of a locomotive in which the power plant system is maintained in a thermally steady state. Some of the benefits of such a technique include the ability to produce quality thermal diagnostics of the power plant system and to trend data over time with a minimum amount of data acquisition.

Figure 3:
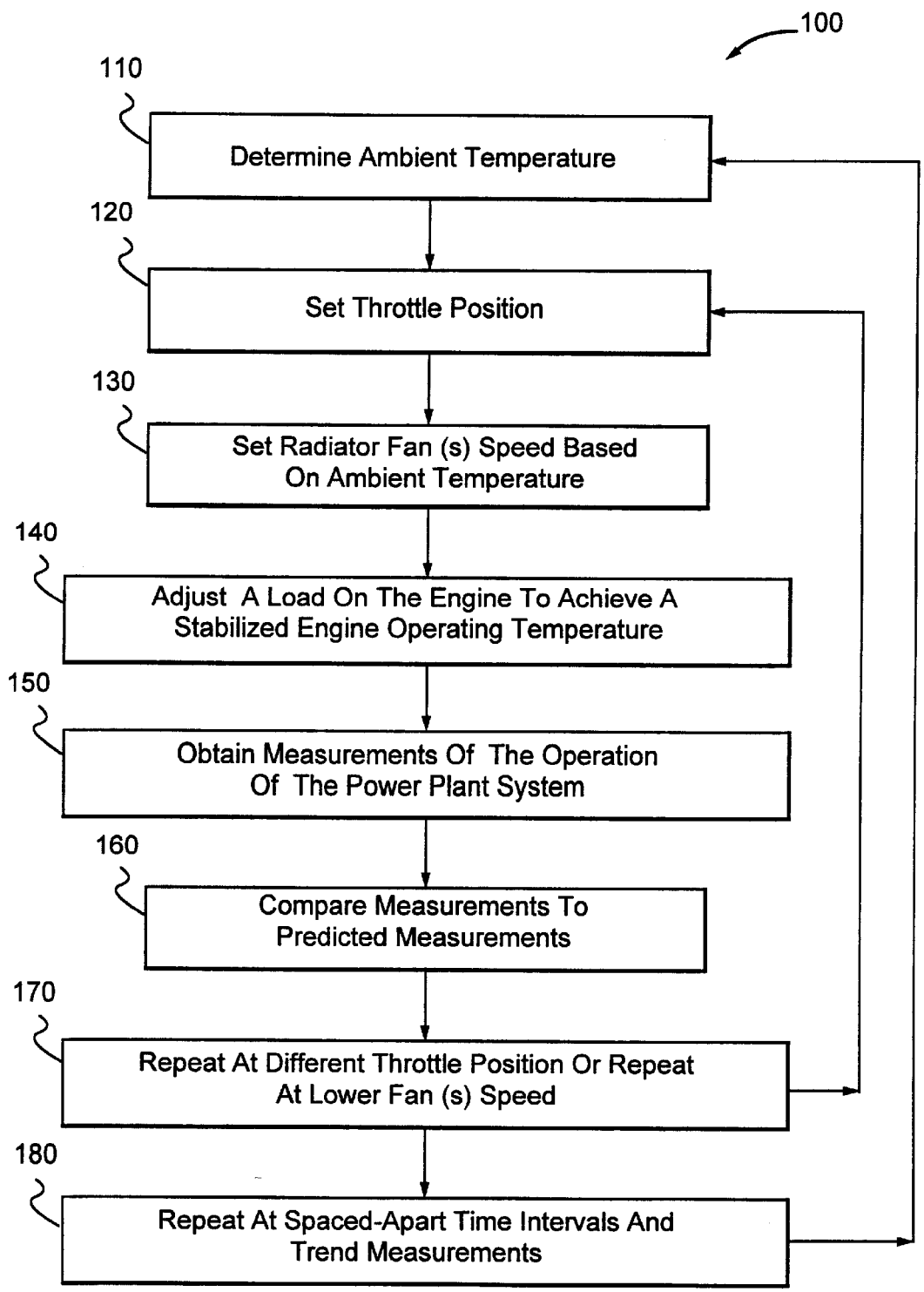
FIG. 3 is a flowchart indicating a series of method steps for testing a power plant system of a locomotive according to the present invention.

One example of a method of the present invention that is typically readily implemented by a computing environment such as the locomotive's elaborate control system (discussed in greater detail below) and readily performed during routine scheduled maintenance of a locomotive, is illustrated in FIG. 3.

Figure 1:
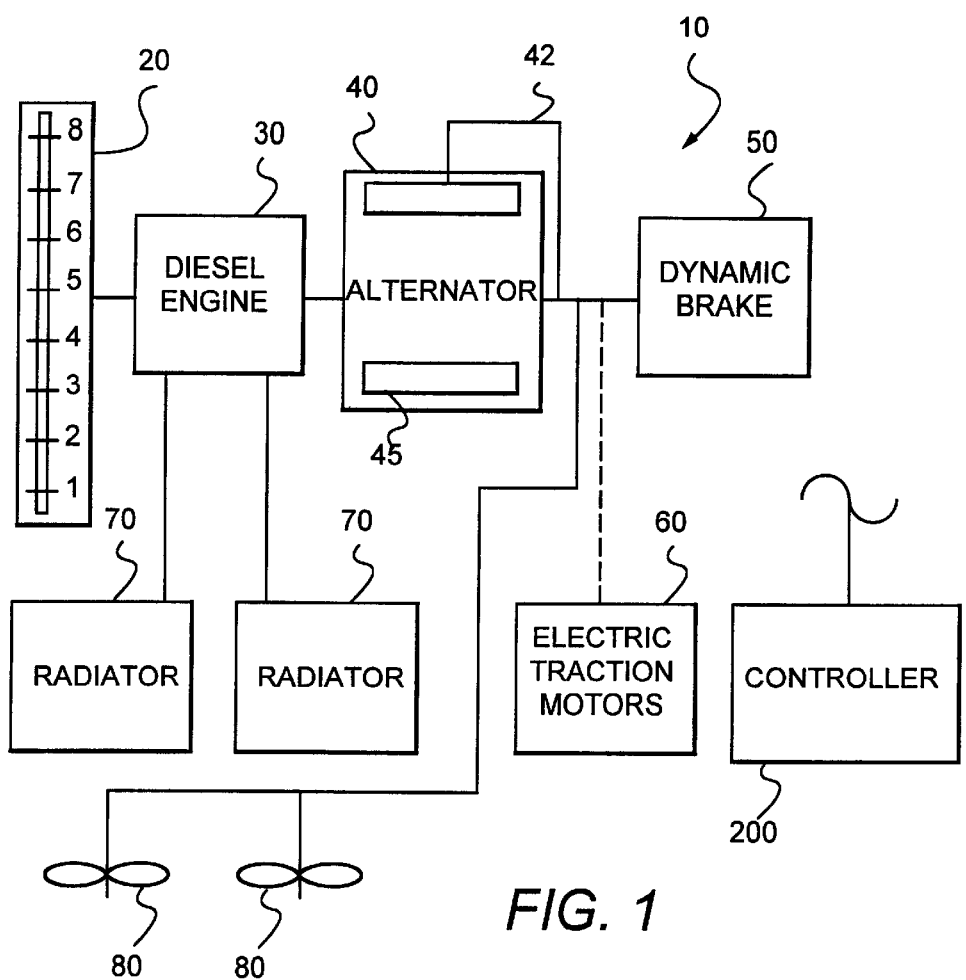
FIG. 1 is a diagrammatic illustration of a power plant system of a locomotive.
Figure 2:
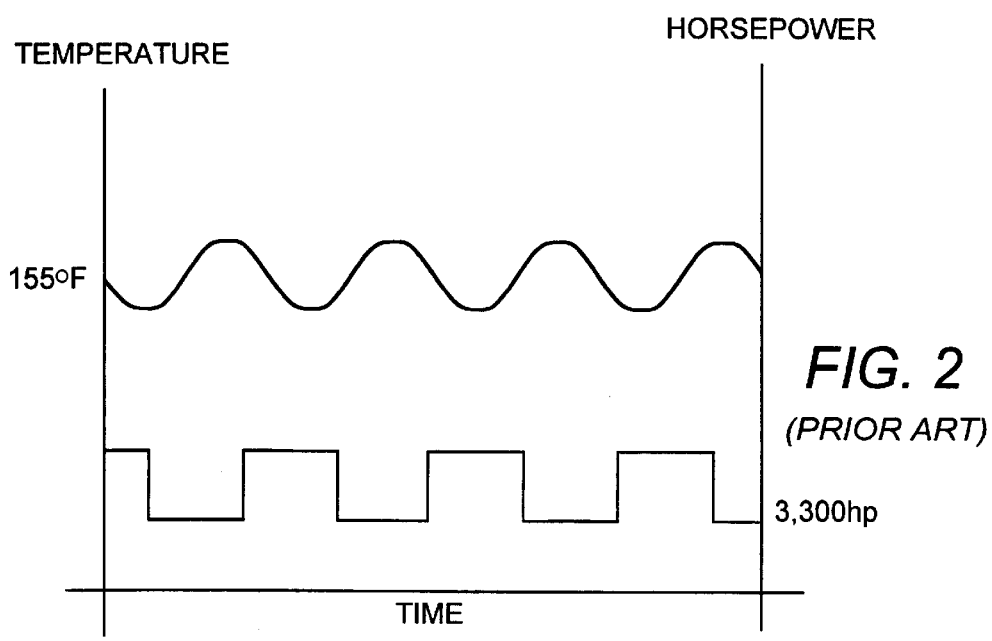
FIG. 2 is a graph of the cooling water temperature of the engine over time, and the horsepower of the engine over time, for testing the power plant system shown in FIG. 1 according to the prior art.

In this exemplary method 100, and with reference also to FIG. 1, initially a first step 110 is to determine the ambient temperature under which the locomotive is operated during the testing of the power plant system.

A second step 120 of this exemplary method is to set throttle 20 at a predetermined position for operation of engine 30 at a fixed speed. Generally, position 1 is idle, positions 2, 3, and 4 are low power levels of operation of diesel engine 30, and positions 5, 6, 7, and 8 are high power levels of operation of diesel engine 30.

The speed of radiator fans 80 are set at a predetermined speed in a third step 130 with the predetermined speed of fans 80 desirably based on the ambient temperature. For example, at low ambient temperatures (For example, less than 45 degrees F.), radiator fans 80 may be set at ½ speed (For example, both radiator fans operated at ¼ speed). At higher ambient temperatures (For example, greater than 45 degrees F.) radiator fans 80 may be set at ¾ speed (For example, one radiator fan operated at ¼ speed and the other radiator fan operated at ½ speed). From the present description, it will be appreciated by those skilled in the art that a power plant system of a locomotive may only have one radiator and one fan, and thus, only one fan would need to be set.

A fourth step 140 of this exemplary method is to slowly increase a load on engine 30 until the cooling water reaches and stabilizes at a desired water temperature. The water temperature is typically maintained within a normal operating range between about 150 degrees F. to about 180 degrees F., and desirably at a specified temperature. A load on diesel engine 30 is applied by coupling and directing the electrical power output from alternator 40 to dynamic brake 50 and directing a portion of the electrical power output via line 42 to field windings 45 of alternator 40 until the load on alternator 40 results in the cooling water through diesel engine 30 and radiators 70 stabilizing at a constant temperature, for example, at 155 degrees F. At this point, the heat balances of the air, oil and water systems become thermally stabilized.

Figure 4:
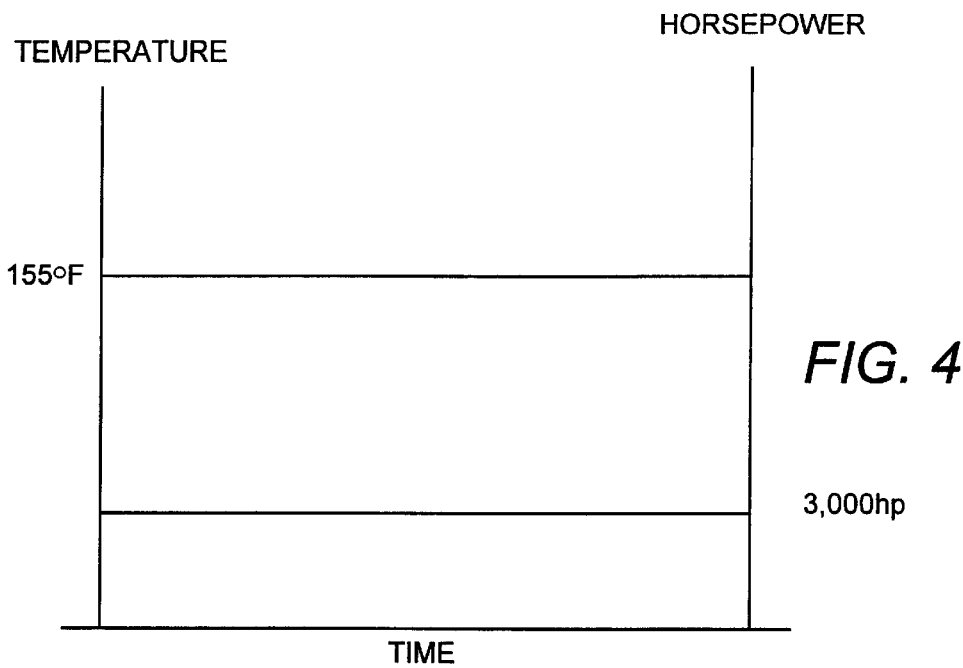
FIG. 4 is a graph of the cooling water temperature of the engine over time, and horsepower of the engine over time, according to the method of FIG. 3.

As shown in FIG. 4, and as a result of steps 110, 120, 130, and 140, the cooling water temperature over time and the horsepower generated by engine 30 over time will both be substantially constant and fixed. For example, at an ambient temperature of 60 degrees F., throttle 20 set at position 6, fans 80 set at ½ speed, and after adjusting the load on alternator 40, the water temperature of the cooling system stabilizes and becomes substantially constant and fixed at 150 degrees F. with diesel engine 30 operating at a substantially constant and fixed 3,000 hp.

Figure 5:
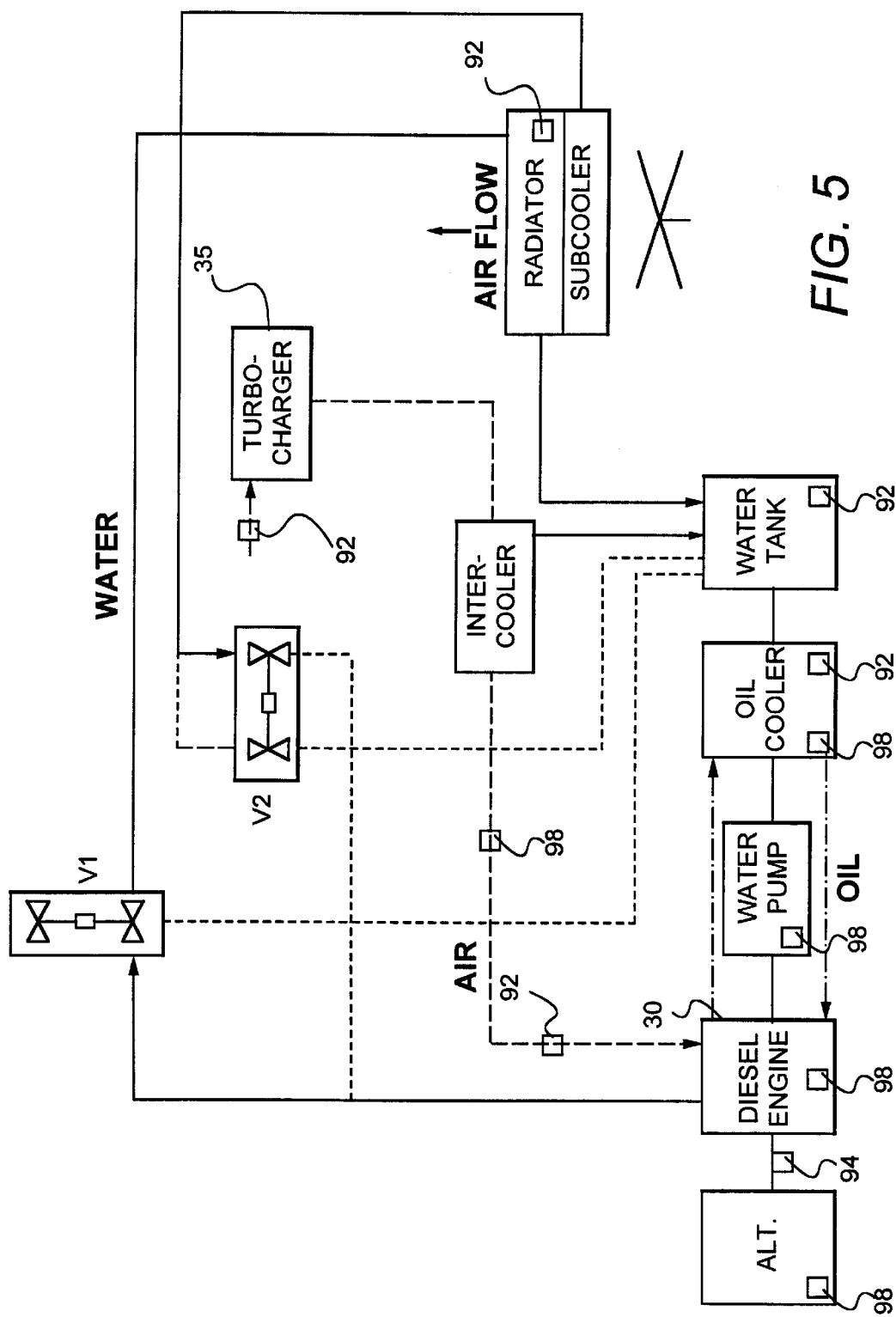
FIG. 5 is a diagrammatic illustration of the thermal systems of the power plant system shown in FIG. 1.

Once power plant system 10 is thermally stabilized and operating in a thermally steady state, a fifth step 150 (FIG. 3) of this exemplary method is to obtain measurements of the operation of the power plant system 10. As shown in FIG. 5, measurement may be taken and signals generated by one or more sensors such as temperature sensors 92 (For Example, ambient air temperature, water temperature, oil temperature, manifold air temperature into engine 30 from a turbocharger 35), speed sensor 94, electrical power sensors 96, and pressure sensors 98 (For example, oil pressure, water pressure, air pressure, fuel pressure sensors). The locomotive's elaborate control system's sensors, or releasably attachable sensors, for example, temperature sensors, electrical sensors, pressure sensors, etc., which sensors are temporally and strategically placed in or on power plant system 10 during the thermally steady state operation of power plant system 10, may be employed.

A sixth step 160 (FIG. 3) includes comparing the measurements to predicted measurements that may be determined by an analytical model, or the locomotive manufacturer's performance specifications. Desirably, the results of the comparison can provide a warning to alert a mechanic of possible concerns regarding a power plant system or a component thereof, alert a mechanic to undertake additional detailed examination of the power plant system 10 or a component thereof, or to recommend necessary repairs.

A seventh step 170 includes repeating each of the steps 120, 130, 140, 150, and 160, to operate throttle 20 at a different throttle position or radiator fans 80 at a different radiator fan speed. For example, once measurements are taken, radiator fans 80 would be set at their next lower setting and the procedure of adjusting the engine load repeated. In this way several measurements of power plant system 10 operating under a thermally steady state could be obtained for engine 30 to provide additional information for analysis of the operation of power plant system 10.

By repeating the above-noted steps at spaced-apart intervals or times, an eighth step 180 allows for trending measurements to detect the early stages of failure of a system, for example, thermal, electrical, or of a component thereof.

From the present description, it will be appreciated by those skilled in the art that the measurements of the power plant system may be recorded and stored for analysis after maintenance of the locomotive. Prior measurements may also be used for comparison, for example, in step 160, and trended. Desirably, the measurements taken during operation of the power plant system (at a given ambient temperature and at a given engine operating temperature) can be readily transformed and normalized based on a standard ambient temperature and operating temperature, for example, about 70 degrees F. ambient temperature and about 150 degrees F. engine operating temperature, to provide a matrix of measurements that can be readily compared or trended to determine the performance of a locomotive or a fleet of locomotives.

Figure 6:
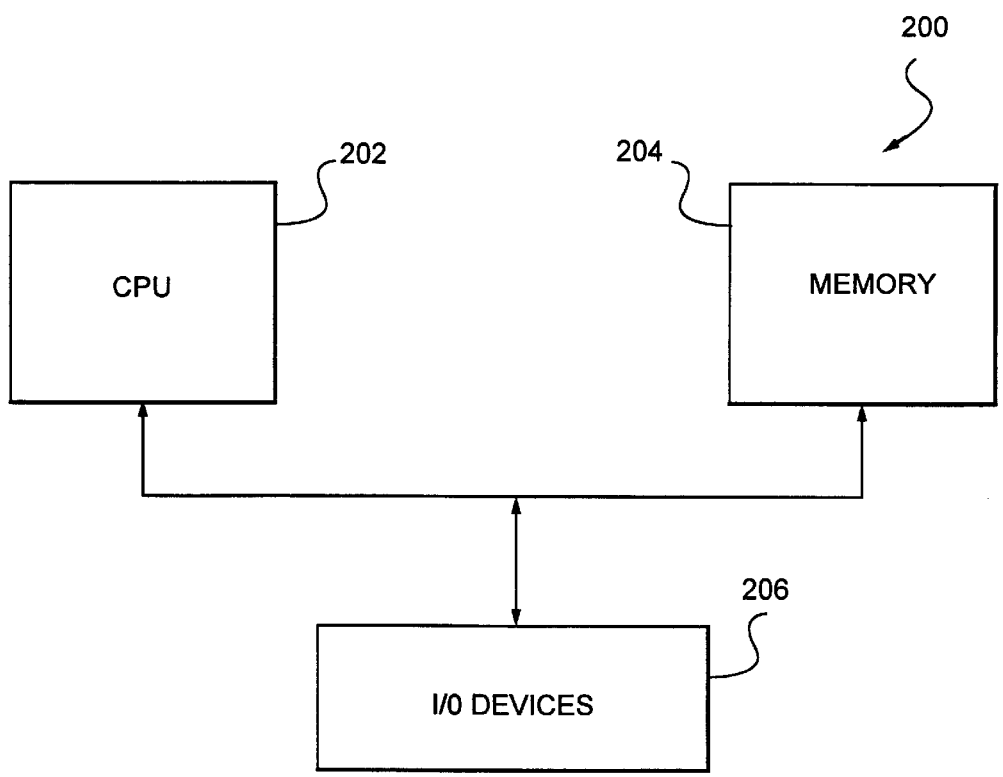
FIG. 6 is a diagrammatic illustration of a computing environment for implementing the method illustrated in FIG. 3.

One example of a controller or computing environment 200 incorporating and using the diagnosing capabilities and techniques of the present invention is depicted in FIG. 6 and described below.

Computing environment 200 includes, for instance, at least one central processing unit 202, a memory or main storage 204, and one or more input/output devices 206, each of which is described below. Desirably, in one example, computing environment 200 may be provided by the locomotive's elaborate control system or a single system environment or multiple system environment which may include one or more PENTIUM based computer systems running an operating system. The invention is not limited to such an environment, however, the capabilities of the present invention can be incorporated and used within many types of computer environments and many types of computer systems. Other variations are also possible and are considered a part of the claimed invention.

As is known, central processing unit 202 is the controlling center and provides the sequencing and processing facilities for instruction execution, interruption action, timing functions, initial program loading and other machine related functions. The central processing unit 202 executes at least one operating system, which as known, is used to control the operation of computing processing unit 202 by controlling the execution of other programs, controlling communication with peripheral devices and controlling use of the computer resources.

Central processing unit 202 is coupled to main storage 204, which is directly addressable and provides for high speed processing of data by central processing unit 202. Main storage may be either physically integrated with the CPU or constructed in stand alone units.

Main storage 204 is also coupled to one or more input/output devices 206. These devices include, for instance, keyboards, communications controllers, teleprocessing devices, printers, magnetic storage media (e.g., tape cartridges or disks), optical storage media (e.g., CD-ROMs), direct access storage devices, and sensor-based equipment (e.g., temperature, electrical power, or pressure sensors as described above). Data is transferred from main storage 204 to input/output devices 206, and from the input/output devices back to main storage 204.

From the present description, computer readable program code means for use in computing environment 200 and for implementing the diagnostic techniques of the present invention may be readily programmed by those skilled in the art and stored on the above-noted storage media or devices, or imbedded in an integrated circuit. The technique may be fully automated or require manual input of various information and parameters prior to undertaking a diagnostic procedure.

By operating the power plant system at a thermally steady state, the various systems of the power plant system, e.g., thermal systems, electrical systems, pressure systems, fuel supply systems, may be readily related and analyzed to pin point or zero in on a system or a component thereof that is inoperable or exhibiting early signs of failure.

While only certain features of the invention have been illustrated and described, many modifications and changes will occur to those skilled in the art. It is, therefore, to be understood that the appended claims are intended to cover all such modifications and changes as fall within the true spirit of the invention.

What is claimed is:

1. An apparatus for testing a power plant system of a locomotive, said apparatus comprising:
   a controller adapted to maintain the power plant system at a thermally steady state; and
   said controller adapted to obtain at least one measurement of the power plant system; wherein said controller is adapted to:
   operate a throttle operably connected to an engine at a predetermined throttle position;
   operate a radiator fan of a radiator operably connected to the engine at a predetermined radiator fan speed; and
   operate an alternator operably connected to the engine to apply a substantially constant load on the engine.

2. The apparatus according to claim 1, wherein the predetermined radiator fan speed of the radiator fan is based on ambient temperature.

3. The apparatus according to claim 1, wherein the load on the engine is based on the current applied to field windings of the alternator.

4. The apparatus according to claim 1, wherein said controller is adapted to repeat operation of the throttle at a different predetermined throttle position.

5. The apparatus according to claim 1, wherein said controller is adapted to repeat operation of the radiator fan at a different predetermined radiator fan speed.

6. The apparatus according to claim 1, wherein said controller is adapted to compare the at least one measurement to a predetermined measurement.

7. The apparatus according to claim 1, wherein said controller is adapted to trend a plurality of measurements obtained over time.

8. An apparatus for testing a power plant system of a locomotive, said apparatus comprising:
   means for maintaining the power plant system at a thermally steady state;
   means for obtaining at least one measurement of the power plant system;
   wherein said means for controlling comprises
   means for operating a throttle operably connected to an engine at a predetermined throttle position;
   means for operating a radiator fan of a radiator operably connected to the engine at a predetermined radiator fan speed; and
   means for operating an alternator operably connected to the engine to apply a substantially constant load on the engine.

9. An article of manufacture comprising:
   at least one computer usable medium having computer readable program code means embodied therein for causing the testing of a power plant system of a locomotive, the computer readable program code means in said article of manufacture comprising:
   computer readable program code means for maintaining the power plant system at a thermally steady state; and
   computer readable program means for obtaining at least one measurement of the power plant system;
   wherein said computer readable program code means for maintaining the engine at a substantially constant operating temperature comprises:
   computer readable program code means for operating a throttle operably connected to an engine at a predetermined throttle position;
   computer readable program code means for operating a radiator fan of a radiator operably connected to the engine at a predetermined radiator fan speed; and
   computer readable program code means for operating an alternator operably connected to the engine to apply a substantially constant load on the engine.

10. A method for testing a power plant system of a locomotive, said method comprising the steps of:
    maintaining the power plant system at a thermally steady state; and
    obtaining at least one measurement of the power plant system;
    wherein said step of maintaining the engine at a substantially constant operating temperature comprises the steps of:
    operating a throttle operably connected to an engine at a predetermined throttle position;
    operating a radiator fan of a radiator operably connected to the engine at a predetermined radiator fan speed; and
    operating an alternator operably connected to the engine to apply a substantially constant load to the engine.

11. The method according to claim 10, wherein said predetermined radiator fan speed of the radiator fan is based on ambient temperature.

12. The method according to claim 10, wherein said load on the engine is based on the current applied to field windings of the alternator.

13. The method according to claim 10, further comprising the step of repeating said method with the throttle operating at a different predetermined throttle position.

14. The method according to claim 10, further comprising the step of repeating said method with the radiator fan operating at a different predetermined radiator fan speed.

15. The method according to claim 10, further comprising the step of repeating said method over time to obtain a plurality of measurements of the power plant system.

16. The method according to claim 15, further comprising the step of trending the plurality of measurements.

17. The method according to claim 10, further comprising the step of comparing the measurement to a predetermined measurement.

18. At least one program storage device readable by a machine, tangibly embodying at least one program of instructions executable by the machine to perform a method of testing a power plant system of a locomotive, said method comprising;

maintaining the power plant system at a thermally steady state; and obtaining at least one measurement of the power plant system;

wherein said step of maintaining the engine at a substantially constant operating temperature comprises the steps of:

operating a throttle operably connected to a engine at a predetermined throttle position;

operating a radiator fan of a radiator operably connected to the engine at a predetermined radiator fan speed; and operating an alternator operably connected to the engine to apply a substantially constant load on the engine.

* * * * *